US009129256B2

(12) United States Patent
Mundy et al.

(10) Patent No.: US 9,129,256 B2
(45) Date of Patent: Sep. 8, 2015

(54) ENABLING COLLABORATION ON A PROJECT PLAN

(75) Inventors: Kiran Mundy, Lexington, MA (US); Bill Caine, Fremont, CA (US); Sivakumar Sundaresan, Union City, CA (US); Kristine Lois Van Der Ploeg, Meridian, ID (US); Margaret Wasowicz, Charlotte, NC (US)

(73) Assignee: Oracle International Corporation, Redwood Shores, CA (US)

( * ) Notice: Subject to any disclaimer, the term of this patent is extended or adjusted under 35 U.S.C. 154(b) by 1210 days.

(21) Appl. No.: 12/508,958

(22) Filed: Jul. 24, 2009

(65) Prior Publication Data

US 2011/0022437 A1    Jan. 27, 2011

(51) Int. Cl.
 G06Q 10/00 (2012.01)
 G06Q 10/10 (2012.01)
 G06Q 10/06 (2012.01)

(52) U.S. Cl.
 CPC .............. *G06Q 10/10* (2013.01); *G06Q 10/06* (2013.01); *G06Q 10/06311* (2013.01); *G06Q 10/06313* (2013.01); *G06Q 10/06375* (2013.01); *G06Q 10/103* (2013.01)

(58) Field of Classification Search
 None
 See application file for complete search history.

(56) References Cited

U.S. PATENT DOCUMENTS

| | | | | |
|---|---|---|---|---|
| 5,652,717 A | * | 7/1997 | Miller et al. | 703/6 |
| 5,808,916 A | * | 9/1998 | Orr et al. | 703/6 |
| 5,815,417 A | * | 9/1998 | Orr et al. | 703/5 |
| 5,818,737 A | * | 10/1998 | Orr et al. | 703/6 |
| 5,974,391 A | * | 10/1999 | Hongawa | 705/7.26 |
| 7,082,457 B1 | * | 7/2006 | Burianek et al. | 709/204 |
| 7,167,844 B1 | * | 1/2007 | Leong et al. | 705/80 |
| 7,568,005 B2 | * | 7/2009 | Nichols et al. | 709/204 |
| 7,734,491 B2 | * | 6/2010 | Kayahara et al. | 705/7.23 |
| 7,739,089 B2 | * | 6/2010 | Gurpinar et al. | 703/10 |
| 7,991,916 B2 | * | 8/2011 | Meek et al. | 709/248 |
| 2002/0046147 A1 | * | 4/2002 | Livesay et al. | 705/37 |
| 2002/0065697 A1 | * | 5/2002 | Cautley et al. | 705/7 |
| 2002/0198926 A1 | * | 12/2002 | Panter et al. | 709/106 |
| 2003/0033191 A1 | * | 2/2003 | Davies et al. | 705/10 |
| 2003/0067492 A1 | * | 4/2003 | Cadwallader | 345/779 |
| 2003/0101089 A1 | * | 5/2003 | Chappel et al. | 705/10 |
| 2003/0106039 A1 | * | 6/2003 | Rosnow et al. | 717/100 |
| 2003/0110067 A1 | * | 6/2003 | Miller et al. | 705/8 |
| 2004/0107125 A1 | * | 6/2004 | Guheen et al. | 705/7 |
| 2005/0114829 A1 | * | 5/2005 | Robin et al. | 717/101 |

(Continued)

OTHER PUBLICATIONS

Microsoft Project 2000 Bible; Author Elaine Marmel; HD 69.P75 M368 2000.*

(Continued)

*Primary Examiner* — Gurkanwaljit Singh
(74) *Attorney, Agent, or Firm* — Miles & Stockbridge PC

(57) ABSTRACT

Systems, methods, and software applications for enabling the collaboration on a project plan are described in the present disclosure. A computer readable medium is configured to store instructions that are executable by a processing device. According to one embodiment, among many, the computer readable medium includes logic adapted to enable a member of a project team to submit a proposal for modifying a current project plan to a project manager. The computer readable medium also includes logic adapted to enable the project manager to accept or reject the proposal for modifying the current project plan. Various team members make changes to a single shared copy of the project plan. The changes can be to a respective team member's section of the plan

20 Claims, 8 Drawing Sheets

(56) References Cited

U.S. PATENT DOCUMENTS

| | | | | |
|---|---|---|---|---|
| 2005/0149307 | A1* | 7/2005 | Gurpinar et al. | 703/10 |
| 2005/0257136 | A1* | 11/2005 | Charisius et al. | 715/511 |
| 2005/0278202 | A1* | 12/2005 | Broomhall et al. | 705/7 |
| 2005/0278209 | A1* | 12/2005 | Kayahara et al. | 705/8 |
| 2006/0044307 | A1* | 3/2006 | Song | 345/419 |
| 2006/0089943 | A1* | 4/2006 | Creel et al. | 707/102 |
| 2006/0161444 | A1* | 7/2006 | Lubrecht et al. | 705/1 |
| 2006/0235732 | A1* | 10/2006 | Miller et al. | 705/7 |
| 2007/0074122 | A1* | 3/2007 | Nichols et al. | 715/751 |
| 2007/0156689 | A1* | 7/2007 | Meek et al. | 707/8 |
| 2008/0065445 | A1* | 3/2008 | Livesay et al. | 705/7 |
| 2008/0148159 | A1* | 6/2008 | Kogan et al. | 715/753 |
| 2008/0312979 | A1* | 12/2008 | Lee et al. | 705/7 |
| 2008/0312980 | A1* | 12/2008 | Boulineau et al. | 705/7 |
| 2008/0313008 | A1* | 12/2008 | Lee et al. | 705/10 |
| 2008/0313595 | A1* | 12/2008 | Boulineau et al. | 717/101 |
| 2010/0234972 | A1* | 9/2010 | Stefano et al. | 700/98 |
| 2010/0257470 | A1* | 10/2010 | Ari et al. | 715/764 |

OTHER PUBLICATIONS

Chandrasekaran, Balakrishnan. "Design problem solving: A task analysis." AI magazine 11.4 (1990): 59.*

Pfahl, Dietmar, and Karl Lebsanft. "Using simulation to analyse the impact of software requirement volatility on project performance." Information and Software Technology 42.14 (2000): 1001-1008.*

Handfield, Robert B., and Steven A. Melnyk. "The scientific theory-building process: a primer using the case of TQM." Journal of operations management 16.4 (1998): 321-339.*

Sargent, Robert G. "Validation and verification of simulation models." Simulation Conference, 2004. Proceedings of the 2004 Winter. vol. 1. IEEE, 2004.*

Rohall, Steven L., and John F. Patterson. "The Zipper System for Flexible, Replicated Application Sharing." (2005).*

Begole, James, Mary Beth Rosson, and Clifford A. Shaffer. "Flexible collaboration transparency: supporting worker independence in replicated application-sharing systems." ACM Transactions on Computer-Human Interaction (TOCHI) 6.2 (1999): 95-132.*

Kouzes, Richard T., James D. Myers, and William A. Wulf. "Collaboratories: Doing science on the Internet." Computer 29.8 (1996): 40-46.*

Business Value Launch 2006; "Sensitivity Analysis and What-If Analysis"; http://pydel.livres.officelive.com/Documents/Sensitivity%20analysis%20and%20What-If%20analysis.pptx; 2006.

"i2 Enterprise Project Planner"; I2 The Supply Chain Company; Dallas, TX 75234, USA; Webwwwi2.com; http://www.i2.com/assets/pdf/PDS_epp_pds7180.pdf; Apr. 2006.

Oracle; "PRIMAVERA P6"; http://www.primavera.com/products/p6/index.asp; downloaded Jan. 23, 2009.

Oracle Data Sheet; "Oracle Project Management"; pp. 1-5; Apr. 2009.

* cited by examiner

600

| Task Number | Task Name | | Resource | Start Date | End Date | Planned Hours | Planned Cost | Predecessor | Status |
|---|---|---|---|---|---|---|---|---|---|
| 1 | Design | | | 1-Jan-09 | 28-Feb-09 | 350 | 35000 | | Approved |
| | 1.1 | FSA | Jack | 1-Jan-09 | 30-Jan-09 | 150 | 15000 | | Approved |
| | 1.2 | FDD | Steve | 15-Jan-09 | 28-Feb-09 | 200 | 20000 | | Approved |
| 2 | Code | | Rajeev | 1-Mar-09 | 30-Mar-09 | 300 | 30000 | 1 | Approved |
| 3 | Test | | Arun | 1-Apr-09 | 30-Apr-09 | 200 | 20000 | 2 | Approved |
| 4 | Document | | Matt | 1-May-09 | 30-May-09 | 100 | 10000 | 3 | Approved |

| Task Number | Task Name | | Resource | Start Date | End Date | Planned Hours | Planned Cost | Predecessor Task | Status |
|---|---|---|---|---|---|---|---|---|---|
| 1 | Design | | | 1-Jan-09 | 28-Feb-09 | 350 | 35000 | | Approved |
| | 1.1 | FSA | Jack | 15-Dec-08 | 30-Jan-09 | 175 | 17500 | | Unapproved |
| | 1.2 | FDD | Steve | 15-Jan-09 | 30-Mar-09 | 300 | 30000 | | Unapproved |
| 2 | Code | | Rajeev | 1-Mar-09 | 30-Mar-09 | 300 | 30000 | 1 | Approved |
| 3 | Test | | Arun | 1-Apr-09 | 30-Apr-09 | 200 | 20000 | 2 | Approved |
| 4 | Document | | Matt | 1-May-09 | 30-May-09 | 100 | 10000 | 3 | Approved |

Fig. 7

| Task Number | Task Name | Resource | Start Date | End Date | Planned Hours | Planned Cost | Predecessor Task | Status |
|---|---|---|---|---|---|---|---|---|
| 1 | Design | | 1-Jan-09 | 28-Feb-09 | 350 | 35000 | | Approved |
| 1.1 | FSA | Jack | 15-Dec-08 | 30-Jan-09 | 175 | 17500 | | Unapproved |
| 1.2 | FDD | Steve | 15-Jan-09 | 28-Feb-09 | 200 | 20000 | | Approved |
| 2 | Code | Rajeev | 1-Mar-09 | 30-Mar-09 | 300 | 30000 | 1 | Approved |
| 3 | Test | Arun | 1-Apr-09 | 30-Apr-09 | 200 | 20000 | 2 | Approved |
| 4 | Document | Matt | 1-May-09 | 30-May-09 | 100 | 10000 | 3 | Approved |

Fig. 8

| Task Number | Task Name | Resource | Start Date | End Date | Planned Hours | Planned Cost | Predecessor Task | Status |
|---|---|---|---|---|---|---|---|---|
| 1 | Design | | 15-Dec-08 | 28-Feb-09 | 375 | 37500 | | Approved |
| 1.1 | FSA | Jack | 15-Dec-08 | 30-Jan-09 | 175 | 17500 | | Unapproved |
| 1.2 | FDD | Steve | 15-Jan-09 | 28-Feb-09 | 200 | 20000 | | Approved |
| 2 | Code | Rajeev | 1-Mar-09 | 30-Mar-09 | 300 | 30000 | 1 | Approved |
| 3 | Test | Arun | 1-Apr-09 | 30-Apr-09 | 200 | 20000 | 2 | Approved |
| 4 | Document | Matt | 1-May-09 | 30-May-09 | 100 | 10000 | 3 | Approved |

Fig. 9

ENABLING COLLABORATION ON A PROJECT PLAN

TECHNICAL FIELD

The present disclosure generally relates to a system for managing a project plan for a project team. More particularly, the embodiments described herein relate to systems and methods for enabling collaboration among the team members to create a project plan for the team.

BACKGROUND

In a business environment, a team of people may be grouped together in order to complete a specific project. In order to define how a project is to be completed and how certain goals are to be accomplished, a project plan can be utilized. The project plan lists different tasks and assigns those tasks to different people on the team. Usually, a project plan can contain tasks that are related hierarchically, where some tasks must be completed before other tasks can be started. Also, a project plan can often have dates or times when certain tasks are to be completed in order for the project to run smoothly for the entire team.

SUMMARY

The present disclosure describes several embodiments of systems, methods, and processing logic for enabling collaborative efforts toward creating a project plan for a project team. Regarding one particular embodiment, a computer readable medium, which is configured to store instructions that are executable by a processing device, includes logic adapted to enable a member of the project team to submit a proposal for modifying a current project plan to a project manager. The computer readable medium also includes logic adapted to enable the project manager to accept or reject the proposal for modifying the current project plan. Various team members make changes to a single shared copy of the project plan. The changes can be to the respective team member's section of the plan Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

FIG. 6 illustrates a saved central copy view of a project plan that includes a list of tasks for a project and sub-tasks in accordance with one embodiment.

FIG. 7 illustrates a view of a single shared copy of the central copy in accordance with one embodiment.

FIG. 8 illustrates the central copy view of the project plan with unapproved changes in accordance with one embodiment.

FIG. 9 illustrates the central copy view of the project plan with the impact of the unapproved changes in accordance with one embodiment.

DETAILED DESCRIPTION

Project plans are often used in business to help define tasks that are assigned to the members of a project team. Also, project plans can define how tasks may be related to other tasks in a hierarchy and can include dependency information for defining the relationships between tasks, such as one task depending upon the completion of another task, etc. Project plans can also include time and date information for setting when each task should be completed.

When a project plan is established, the plan can be distributed to each member of the team to provide the information that the members need to understand how the project can be completed. Sometimes, however, only the relevant portions of the plan are provided to the respective members so the each member can see the particular portions for which that member is responsible. During the creation of the project plan, the team members can give feedback to the project manager to inform the manager of any known conflicts or other problems that may impede the flow of tasks or the completion of the project. In this respect, the project plan may go through one or more revisions before a final plan is established.

In the present disclosure, several embodiments are described for allowing members of a project team to collaborate on the creation of a project plan. As the organizer of the project plan, the project manager can make changes to the project plan as he or she desires and the changes are sent down through the hierarchy to all the members. If a team member proposes a change, the project manager must approve the changes before they go into effect. According to the embodiments described herein, the project manager is enabled to perform a "what-if" analysis on the proposed changes to see how the changes might affect other people, tasks, deadlines, etc. Therefore, the what-if analysis can be used to determine the impact that the proposed changes might have on the project plan.

Figure 1:
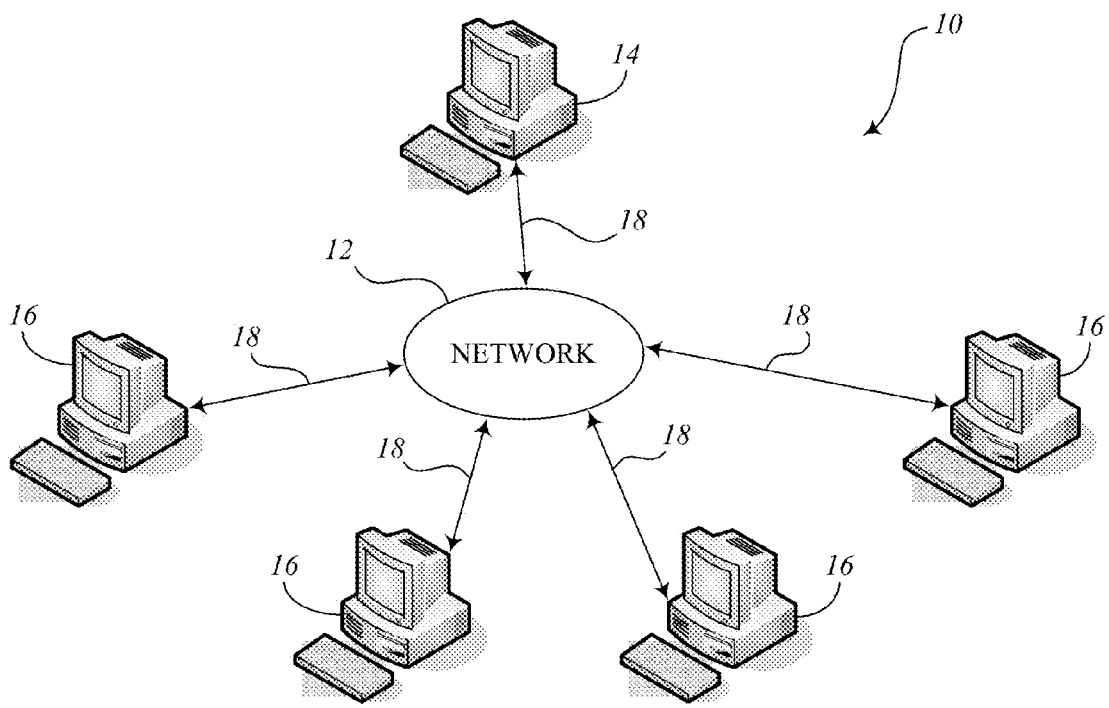
FIG. 1 is a diagram illustrating a collaboration system according to one embodiment.

FIG. 1 is a diagram illustrating an embodiment of a collaboration system 10 according to one implementation. In this embodiment, collaboration system 10 includes a network 12 for enabling communication among a project manager device 14 and a number of team member devices 16 via communication channels 18. Network 12 and communication channels 18 may include any suitable combination of switches, relays, transmission lines, wireless communication channels, etc., for allowing data and information to be exchanged. In particular, data can be uploaded from a team member device 16 to project manager device 14 and downloaded from project manager device 14 to a team member device 16 as needed.

Project manager device 14 may include internal memory or be in communication with external memory for storing a project plan that is applicable to the members of a team. Each team member device 16 can be used by one or more members of the team to view the project plan. In addition, one or more team members can submit proposals from team member device 16 to project manager device 14 for the project manager's review, where the proposal, in general, proposes changes to the project plan or a portion thereof. In this respect, the memory associated with project manager device 14 can also store project plans in the process of being modified.

Project manager device 14 and team member devices 16 may be computing systems, such as computers, data processing systems, or other suitable electronic devices for executing logic instructions. In some embodiments, project manager device 14 and/or team member devices 16 may be mobile computing devices. A processing device may be incorporated within each of project manager device 14 and team member devices 16 for controlling the functions of the respective device.

Figure 2:
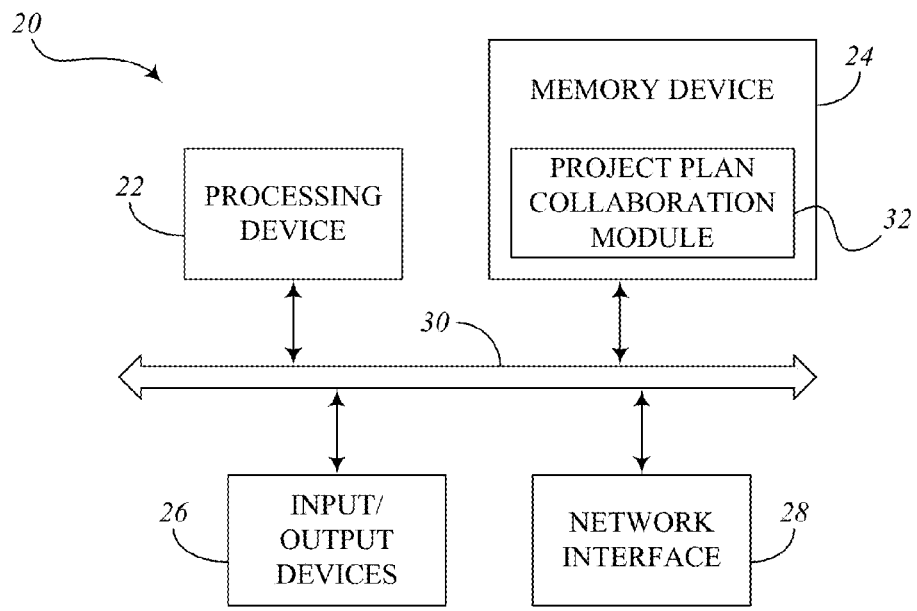
FIG. 2 is a block diagram illustrating one of the computers shown in FIG. 1, according to one embodiment.

FIG. 2 is a block diagram illustrating an embodiment of a computing device 20, which represents project manager device 14 and/or at least one of the team member devices 16 shown in FIG. 1, according to one implementation. In this embodiment, computing device 20 includes a processing device 22, memory device 24, input/output devices 26, and network interface 28, each interconnected via a bus 30. Network interface 28 enables communication between team member devices 16 and project manager device 14 via network 12. Memory device 24 contains, among other things, project plan collaboration module 32, which may include a project plan for the members of a project team and logic for enabling the modification of the project plan in a collaborative manner.

Processing device 22 may be a general-purpose or specific-purpose processor or microcontroller. Memory device 24 may include one or more internally fixed storage units, removable storage units, and/or remotely accessible storage units. Also, memory device 24 may include any suitable combination of volatile memory and/or non-volatile memory and can be configured to store information, data, instructions, and/or software code. Input/output devices 26 may include input mechanisms such as keyboards, keypads, cursor control devices, or other data entry devices. The input mechanisms enable a user to enter information or instructions in computing device 20. Input/output devices 26 may also include output mechanisms, such as computer monitors, display screens, audio output devices, printers, or other peripheral devices for communicating information to the user.

The embodiments of project plan collaboration module 32 described in the present disclosure can be implemented in hardware, software, firmware, or a combination thereof. When implemented in software or firmware, project plan collaboration module 32 can be stored in memory device 24 as shown in FIG. 2 and executed by processing device 22. Alternatively, when implemented in hardware, project plan collaboration module 32 can be implemented in processing device 22 using discrete logic circuitry, an application specific integrated circuit (ASIC), a programmable gate array (PGA), a field programmable gate array (FPGA), or any combination thereof.

Project plan collaboration module 32, and other software, computer programs, or logic code that includes executable logical instructions as described herein, can be embodied in a computer-readable medium for execution by any suitable processing device. The computer-readable medium as described herein can include one or more suitable physical media components that can store the software, programs, or code for a measurable length of time.

Figure 3:
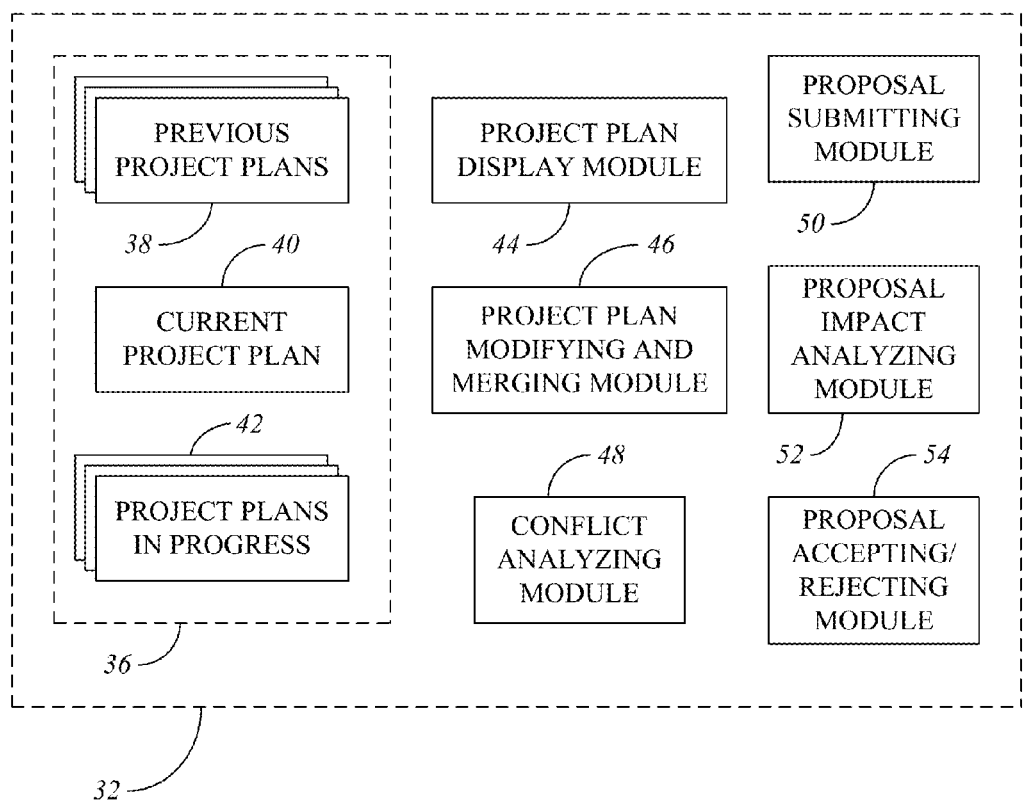
FIG. 3 is a block diagram illustrating the project plan collaboration module shown in FIG. 2, according to one embodiment.

FIG. 3 is a block diagram illustrating an embodiment of project plan collaboration module 32 shown in FIG. 2, according to one implementation. In this embodiment, project plan collaboration module 32 includes a project plan database 36 configured to store, among other things, one or more previous project plans 38, a current project plan 40, and project plans in progress 42. For example, project plans in progress 42 may include proposed changes to current project plan 40. Project plan database 36 may include any suitable combination of volatile memory and/or non-volatile memory and can be configured to store data and/or software code related to project plan information.

Previous project plans 38 may include plans that were eventually replaced by current project plan 40. These can be retrieved, if necessary, such as when it is determined, for instance, that current project plan 40 includes conflicts or is infeasible for some reason. Current project plan 40 represents the project plan that is considered to be the current plan in place for the project team, at least until the current plan is replaced, if ever. Project plans in progress 42 may include one or more proposed project plans, current project plan 40 in the process of being modified, or other project plans under consideration. If one of the plans of project plans in progress 42 are accepted as a replacement for current project plan 40, then this new plan is stored as and referred to at that point as the new current project plan 40.

In addition to project plan database 36, project plan collaboration module 32 also includes a project plan display module 44, a project plan modifying and merging module 46, a conflict analyzing module 48, a proposal submitting module 50, a proposal impact analyzing module 52, and a proposal accepting/rejecting module 54. Project plan display module 44 is configured to display the contents or a portion of the contents of the project plan for a team member or project manager wishing to see the particular project plan for the project team. In particular, project plan display module 44 can display current project plan 40 for the requesting member. In other embodiments, project plan display module 44 can display one of previous project plans 38 or project plans in progress 42 upon request.

Project plan modifying and merging module 46 is configured to enable the project manager to modify the project plan and/or merge at least a portion of current project plan 40 with at least a portion of another plan. These modifying and merging procedures can be accomplished by commands from the project manager without analysis of the consequences. However, if the project manager wishes to undo the changes, the project manager can retrieve one of the previous project plans 38, i.e., the project plan that was replaced or that which was formerly the current project plan before modifications and/or merges were executed.

Conflict analyzing module 48 is configured to determine whether or not the tasks and/or timeframes of current project plan 40, or one of the project plans in progress 42, contain any conflicts. For example, there may be conflicts with respect to the assignment of tasks to incorrect or unauthorized team members. There may also be timing conflicts that may result from a dependence of the completion of one task before another task can be completed. These and other types of conflicts can also be analyzed by conflict analyzing module 48.

Proposal submitting module 50 is configured to enable a team member to analyze the current project plan or at least the portions of the project plan that are associated with the duties of that particular team member. Proposal submitting module 50 also enables the team member to make modifications to current project plan 40 and then submit these modifications, as a proposal, to the project manager. Normally, the current project plan is not changed to the proposed plan until the project manager has reviewed and accepted the proposal. However, if the project manager does not wish to implement the proposed plan, the proposal can be rejected, and hence current project plan 40 can remain unchanged.

When a team member submits a proposal using proposal submitting module 50, project manager device 14 (FIG. 1) is configured to receive the proposal for the project manager. Proposal impact analyzing module 52 is configured to present the proposal to the project manager. Also, proposal impact analyzing module 52 enables the project manager to initiate a process to cause proposal impact analyzing module 52 to automatically run the changes through the current project plan and determine any consequential changes upstream or downstream from the proposed changes. For example, if one or more tasks are changed, the impact of those changes may be carried through to other parts of the project plan. Proposal impact analyzing module 52 can analyze the impact, consequences, and/or extent of the changes on other tasks, timeframes, operators, etc., which are part of the project plan. Once proposal impact analyzing module 52 has completed an analysis of the impact of the proposal, this analysis can be reported to the project manager, who can then decide if the resulting project plan is preferred to the current plan.

If the proposed project plan is preferred to the current plan, proposal accepting/rejecting module 54 is configured to enable the project manager to accept the proposal. In this case, the proposal, along with the calculated impact of the proposal on the rest of the plan, is saved as current project plan 40. Then, when the current project plan is retrieved by a team member or project manager, this new project plan is presented as the current plan. On the other hand, if the project manager decides that the impact of the analyzed proposal is not preferred to the current plan, then proposal accepting/rejecting module 54 enables the project manager to reject the plan. When the proposal is rejected, a notice can be sent to the proposing team member to indicate the proposal was not accepted. Also, according to some embodiments, any project plans in progress 42 related to the proposal can be deleted. Or if current project plan 40 was altered by the proposal, the current project plan can be retrieved from previous project plans 38 and given the rightful status as the current plan.

Figure 4:
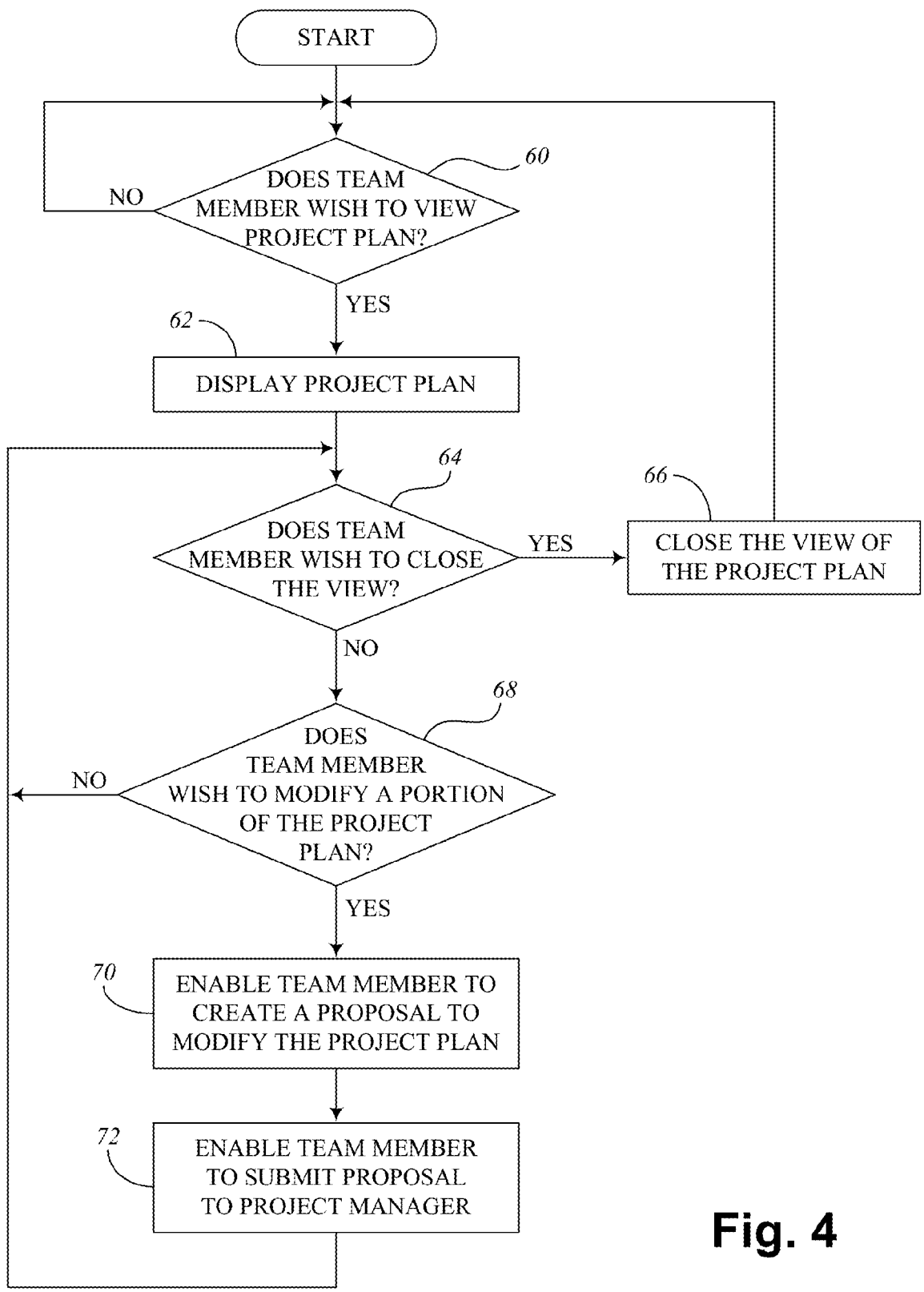
FIG. 4 is a flow diagram illustrating collaboration processes related to a team member, according to one embodiment.

FIG. 4 is a flow diagram illustrating an embodiment of a method for executing collaboration processes related to a member of a project team. At the start of the method, it is determined whether or not a team member wishes to view the current project plan, as indicated in decision block 60. If not, then the method loops back until the team member wishes to view the plan. If so, the project plan is displayed for the team member, as indicated in block 62. It is then determined if or when the team member wishes to close the view of the project plan, as indicated in decision block 64. When the team member wishes to close the view, the method proceeds to block 66, which indicates that the view of the project plan is closed. And then the method returns back to decision block 60.

If the team member does not wish to close the view, the method proceeds to decision block 68. As indicated in decision block 68, it is determined whether or not the team member wishes to modify a portion of the project plan. If not, then the method loops back to decision block 64. However, if the team member wishes to modify the project plan, the method proceeds to block 70. As indicated in block 70, the team member is enabled to create a proposal to modify the current project plan. As indicated in block 72, the team member is enabled to submit the proposal to the project manager. Then, the method returns back to decision block 64.

Figure 5A:
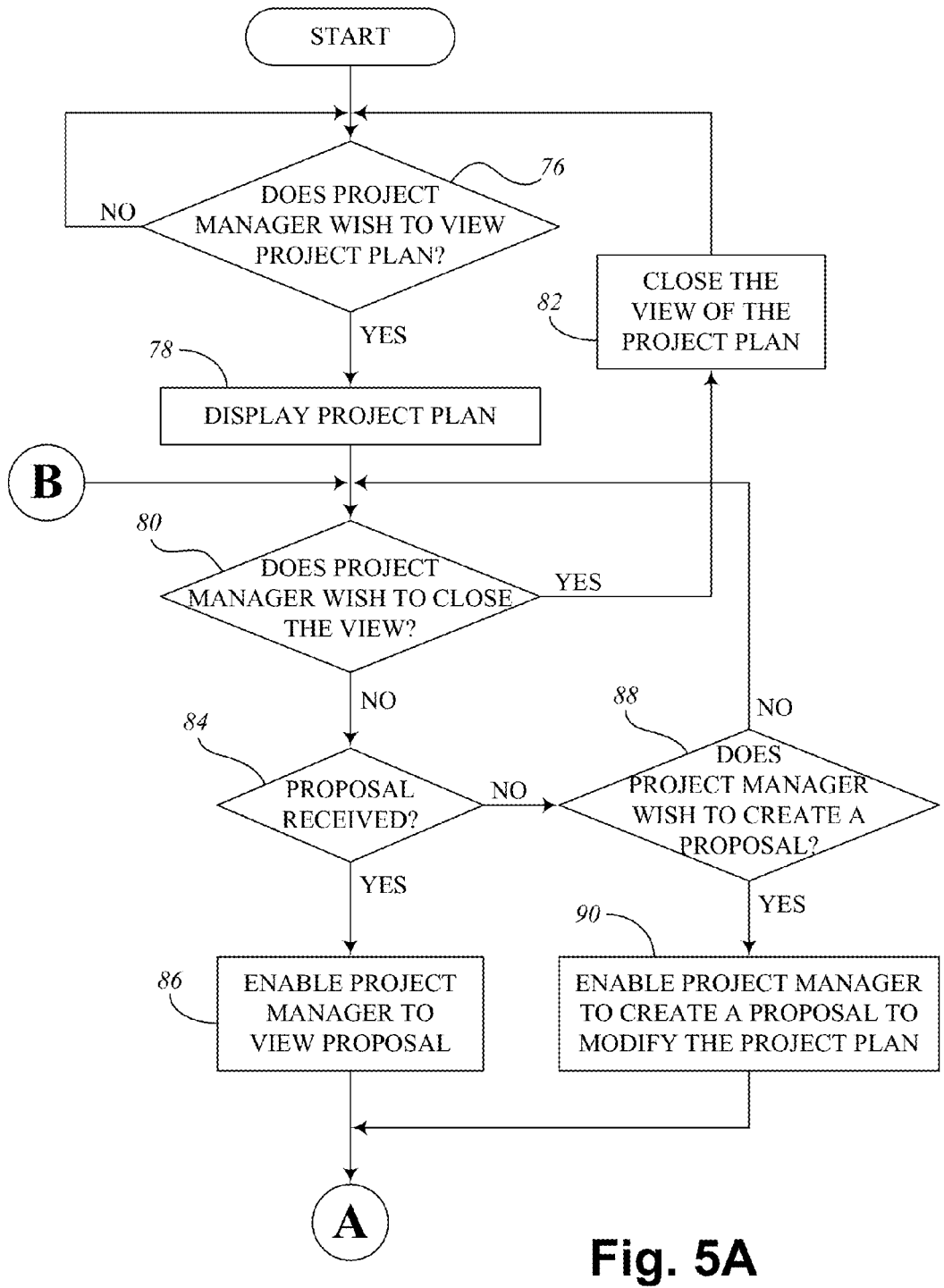
FIGS. 5A and 5B, when combined, are a flow diagram illustrating collaboration processes of a project manager, according to one embodiment.
Figure 5B:
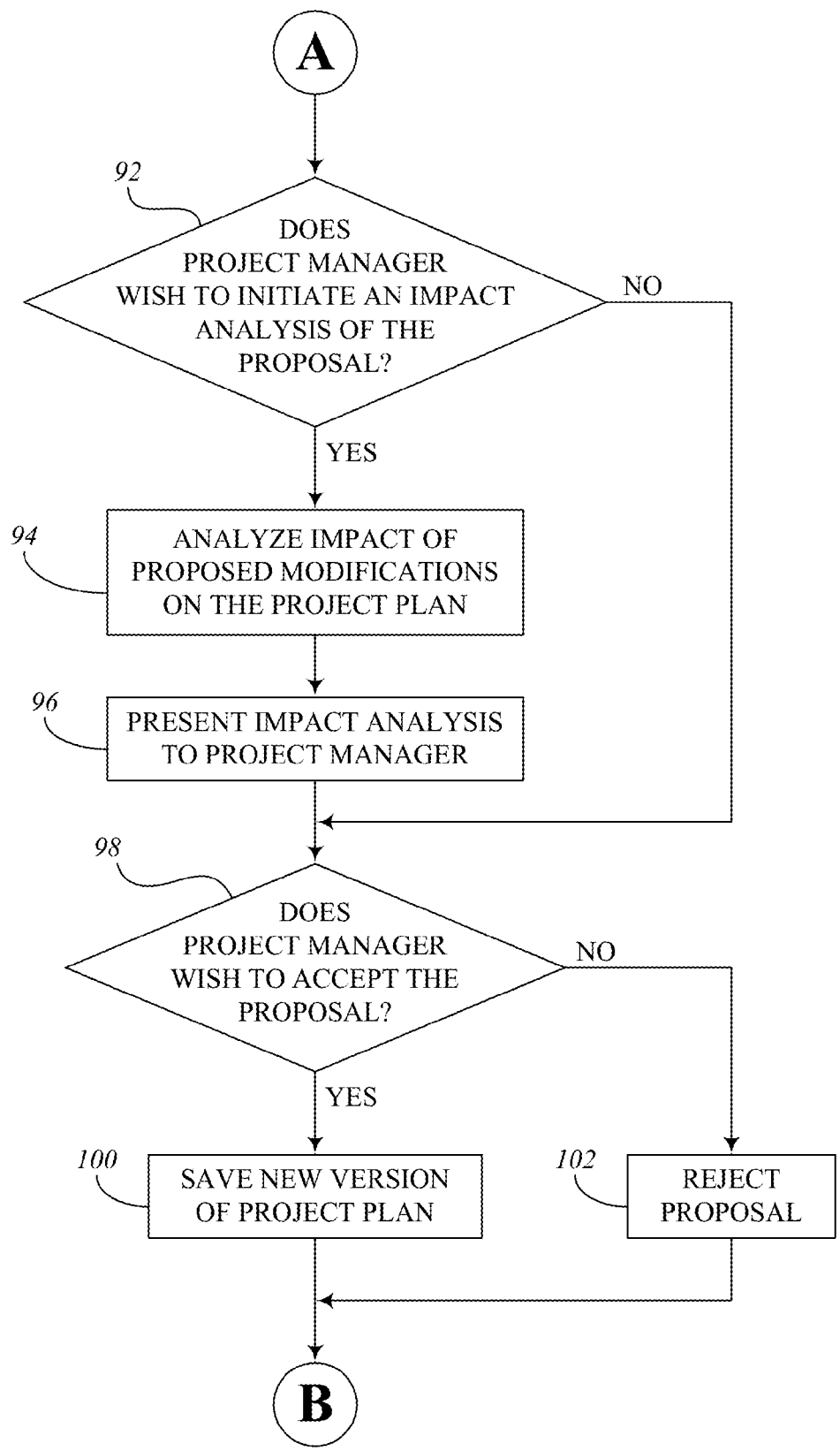

FIGS. 5A and 5B cumulatively comprise a flow diagram of an embodiment of a method for executing collaboration processes related to a project manager. At the start of the method, according to the embodiment of FIG. 5, it is determined whether or not the project manager wishes to view the current project plan (or any proposals for modifying the project plan or other information related to the project plan), as indicated in decision block 76. If such views are not desired, the method loops back to the same decision block until the view of the project plan is desired. If the project manager wishes to view the plan, the method proceeds to block 78, which indicates that the project plan is displayed for the project manager. It is then determined if or when the project manager wishes to close the view of the project plan, as indicated in decision block 80. When the project manager wishes to close the view, the flow goes to block 82, which indicates that the view of the project plan is closed. And then the method returns to decision block 76.

However, if the view is not to be closed at this point, the method proceeds to decision block 84, which indicates that it is determined whether or not a proposal has been received from one of the team members. If a proposal has been received, the method proceeds to block 86, which indicates that the project manager is enabled to view the proposal. Then, the method proceeds to decision block 92, shown in FIG. 5B. If it is determined in decision block 84 that a proposal was not received, then the method goes to decision block 88, which indicates that it is determined whether or not the project manager wishes to create a proposal.

It should be noted that the project manager does not necessarily need to propose changes in order for a change to go into effect since the project manager normally has the authorization to make changes without acceptance by another person. Therefore, in some embodiments, the project manager can simply put any desired modifications into immediate effect, which are translated to each of the team members. However, it may be desired by the project manager to conceptualize modifications to the current plan without those modification being saved as a replacement plan for the entire team. In this case, the project manager can see the impact of his or her own suggested changes (as mentioned below) before actually putting the new project plan into effect.

If the project manager does not wish to create a proposal, as indicated in decision block 88, the method loops back to decision block 80. However, if the project manager wishes to create a proposal, the method proceeds to block 90, which indicates that the project manager is enabled to create a proposal to modify the project plan. Then the method proceeds to decision block 92 shown in FIG. 5B.

As indicated in decision block 92, it is determined whether or not the project manager wishes to initiate an impact analysis of a proposal. That is, the proposal in this case can be a proposal received from one of the team member or a proposal created by the project manager himself or herself. If an impact analysis is desired, the method proceeds to block 94, which indicates that the impact of the proposed modifications on the project plan are analyzed. The analysis is carried throughout the entire project plan to determine any consequences of those changes in order that the impact can be seen. The impact analysis is then presented to the project manager, as indicated in block 96.

After presenting the impact analysis, or if it is determined in decision block 92 that an impact analysis is not desired, the method goes to decision block 98. As indicated in decision block 98, it is determined whether or not the project manager wishes to accept the proposal. If so, the method proceeds to block 100, which indicates that the new version of the project plan is saved as the current project plan. The project plan previously considered to be the current plan can then be stored as a previous plan, which can be retrieved if necessary at a later time. If the project manager does not accept the proposal, the method goes to block 102, which indicates that the proposal is rejected. If necessary, the current project plan is reverted back to its status or condition before the proposal was being considered, when the proposal to modify the plan is rejected. After blocks 100 or 102, the method returns back to decision block 80 so that the project manager can close the view of the project plan and/or consider other proposals.

As an example of the functionality of embodiments of the present invention, FIG. 6 illustrates a saved central copy of a project plan (e.g., saved in current project plan 40 of FIG. 3) that appears as view 600 and that includes a list of tasks for a project (i.e., tasks 1-4) and sub-tasks for task 1 (i.e., tasks 1.1. and 1.2). In addition to a task number, each task includes a task name, a resource, a start and end date, planned hours and planned costs. A predecessor column lists a hierarchical task number that must be completed/approved before that task is begun. Therefore, for example, task 2 cannot be started until task 1 is approved. A status column indicates the status of the task. The project plan includes rollup and downstream logic so if the project manager makes a change to Jack's or Steve's record, the parent record (i.e., task 1) changes and the changes are saved and displayed "immediately" so all project team members can see the changes to the rest of the plan. Rollup and downstream logic is disclosed, for example, in "Project Management" from Oracle Corp.

A single shared current copy of the central copy is made and appears as view 700 shown in FIG. 7. The shared copy permits users to make changes and is the same for all user (i.e., has the same content). In one embodiment, each user can make changes only to their respective section. For example, assume that Jack makes changes to the start date, end date and planned hours for his sections, and Steve makes changes to the start date, end date and planned hours for sections assigned to him. These changes will appear on the shared copy but not on the central copy. The changes are "unapproved", since they have not been approved by the project manager, as indicated in the status column. Changes made in the shared copy, while unapproved, are visible only to the team member that made the change and the project manager, and do not effect the remainder of the plan (i.e., no rollup or downstream impact). In one embodiment, each user's view of the single shared copy may vary depending on the user. For example, a user's view may be a combination of rows from the shared copy, and other team members "unapproved" rows from the central copy.

At the start of the cycle, the central and shared copies both look the same as view 600 in FIG. 6, and this is what all team members and the project manager see. When Jack and Steve submit their changes to their respective sections, the project manager will see the view 700 shown in FIG. 7. The project manager can then decide to do a "what-if" analysis of Jack's changes. Before selecting this analysis, the shared copy appears to the project manager as view 800 of FIG. 8. In view 800, Jack's unapproved changes are shown but the impact is not yet shown. In FIG. 9, a "what-if" analysis view 900 of the shared copy now shows the impact of Jack's changes through the rollup and downstream logic as if the changes were made by the project manager but not saved. Steve's changes show onscreen, but are not included in the impact analysis. In one embodiment, the same rollup and downstream logic used to implement changes can be used to perform and display the what-if analysis. The impact includes changing the start date, planned hours and planned costs of Task 1.

Figure 10:
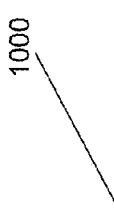
FIG. 10 illustrates the central copy view of the project plan after the changes have been approved in accordance with one embodiment.

After the what-if analysis, the project manager can approve Jack's changes. Once the changes are approved, it is saved in the shared copy and central database, and the shared copy appears as view 1000 of FIG. 10. The rollup and downstream impacts are also saved. If the project manager rejects the changes, that portion of the changed record (i.e., the "Jack" portion) is updated back to its prior from by copying it from the "saved central" copy. Other portions that have previously been approved will not revert back to the prior saved central copy. The same process can then be repeated for Steve's proposed changes. The views of FIGS. 6-10 may be implemented as a user interface in one embodiment.

As discussed in conjunction with FIGS. 6-10, in one embodiment all changes happen against shared copy. The central copy never changes and is used for the following purposes:

To revert "rejected" sections on the shared copy. For example, if Jack's rows get rejected by the project manager, they will be reverted from the central copy.

When a team member is viewing the "shared copy", other people's unapproved rows do now show up. Instead, the corresponding rows are read and displayed from the central copy. For example, when Steve views the plan, he will not see Jack's unapproved rows. Instead he will see Jack's original unchanged rows from the central copy.

When the "what-if" analysis is performed on the shared copy, rollups etc. must be done. When doing these rollups, "unapproved rows" will be read from the central copy. The only exception is the specific row on which the "what-if" analysis is being performed. For example, when the project manager is doing a what-if analysis on Jack's rows, Steve's rows from the central copy will be used, since his rows in the shared copy are "unapproved" and not specifically included in the "what-if" analysis. Jack's "unapproved" rows in the shared copy will be included in the rollups, since the project manager is doing the "what-if" analysis specifically on these rows.

As disclosed, the use of a central copy and a shared copy allows changes to be proposed and analyzed before being approved. In contrast, known project planning systems typically attempt to merge multiple copies of the project plan as they are submitted and approved by the project manager. With embodiments of the present invention, there is no longer a need for a "merge" program or any additional logic or user interfaces to enable the project manager to resolve conflicts between the project manager's changes and those made by the team members. When the project manager performs a "what-if" analysis on a specific "change", the downstream/rollup impacts of that change to the rest of the project plan are displayed. When the project manager "approves" the change, the downstream/rollup impacts of the change get "saved". If "disapproved" that portion of the plan reverts to the relevant portion from the saved copy before the changes. Previously known functionality that allows a project manager to make changes to the project plan independently of the team members can be used in one embodiment by the project manager to perform the what-if analysis, without saving the data until approval. The changes can be saved if approved, or rejected.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementations and examples and are not intended to necessarily limit the present disclosure to any specific embodiments. Instead, various modifications can be made to these embodiments as would be understood by one of ordinary skill in the art upon reading and understanding the present disclosure. Any such modifications are intended to be included within the spirit and scope of the present disclosure and protected by the following claims.

We claim:

1. A non-transitory computer readable medium configured to store instructions that, when executed by a processor, manages a project, the managing comprising:
   creating a shared copy of a current project plan stored in a database, the current project plan including a plurality of tasks, each task identifying a team member authorized to propose modifications to the task;
   enabling viewing of the shared copy of the current project plan on a plurality of project team member devices;
   modifying the shared copy of the current project plan to include proposed modifications to a particular task of the current project plan received from an authorized project team member device;
   enabling viewing of the shared copy of the current project plan, with the proposed modifications to the particular task, on the authorized project team member device;
   enabling viewing of the shared copy of the current project plan, without the proposed modifications to the particular task, on unauthorized project team member devices:
   analyzing the impact of the proposed modifications on the current project plan, including determining any consequential changes upstream or downstream from the proposed modifications;
   enabling acceptance of the proposed modifications to the particular task, and, if accepted, saving the shared copy of the current project plan as the current project plan in the database; and
   enabling rejection of the proposed modifications to the particular task, and, if rejected, removing the proposed modifications from the shared copy of the current project plan.

2. The computer readable medium of claim 1, wherein the shared copy of the current project plan is modifiable by more than one member of the project team.

3. The computer readable medium of claim 1, further comprising storing previous versions of the current project plan in the database.

4. The computer readable medium of claim 3, further comprising restoring a previous version as the current project plan.

5. The computer readable medium of claim 1, further comprising analyzing conflicts of tasks of the current project plan.

6. The computer readable medium of claim 1, wherein, if the proposed modifications to the particular task are accepted, a corresponding modified project plan in progress is deleted.

7. The computer readable medium of claim 1, further comprising modifying the current project plan and merging portions of another project plan with the current project plan.

8. The computer readable medium of claim 1, wherein the managing further comprises:
   modifying, by the project manager device, the shared copy of the current project plan to include proposed modifications to a different task of the current project plan received from a different authorized team member device;
   enabling, by the project manager device, viewing of the shared copy of the current project plan, with the proposed modifications to the different task, on the different authorized team member device;
   enabling, by the project manager device, viewing of the shared copy of the current project plan, without the proposed modifications to the different task, on unauthorized team member devices;
   analyzing, by the project manager device, the impact of the proposed modifications to the different task on the current project plan independent of the proposed modifications to the particular task, including determining any consequential changes upstream or downstream from the proposed modifications.

9. A collaboration system comprising:
   a project manager device connected to a network and one or more team member devices, the project manager device configured to be used by a project manager, each team member device connected to the network and configured to be used by one or more team members of a project team being led by the project manager,
   wherein the project manager devices creates a shared copy of a current project plan stored in a database, the current project plan including a plurality of tasks, each task identifying a team member authorized to propose modifications to the task,
   wherein the project manager device enables viewing of the shared copy of the current project plan on a plurality of team member devices,
   wherein a particular team member device determines whether a particular team member is authorized to modify a particular task of the current project plan,
   wherein the particular team member device enables the particular team member to create proposed modifications to the particular task of the current project plan,
   wherein the particular team member device enables the particular team member to submit the proposed modifications to the particular task to the project manager device,
   wherein the project manager device modifies the shared copy of the current project plan to include the proposed modifications to the particular task,
   wherein the project manager device enables viewing of the shared copy of the current project plan, with the proposed modifications to the particular task, on the particular team member device,
   wherein the project manager device enables viewing of the shared copy of the current project plan, without the proposed modifications to the particular task, on unauthorized team member devices,
   wherein the project manager device enables acceptance of the proposed modifications to the particular task by the project manager, and
   wherein the project manager device saves the shared copy of the current project plan as the current project plan in the database.

10. The collaboration system of claim 9, wherein the project manager device analyzes the impact of proposed modifications to the particular task on the shared copy of the current project plan, including determining any consequential changes upstream or downstream from the proposed modifications, before the proposed modifications are put into effect in the current project plan.

11. The collaboration system of claim 10, wherein the project manager device enables rejection of the proposed modifications to the particular task, and, if rejected, the project manager removes the proposed modifications from the shared copy of the current project plan.

12. The collaboration system of claim 11, wherein, if the project manager rejects the proposed modifications to the particular task, a previous version of the current project plan is restored.

13. The collaboration system of claim 9, wherein the project manager device analyzes conflicts of the shared copy of the current project plan with respect to tasks, deadlines, and team members.

14. The system of claim 10, wherein:
a different team member device determines whether a different team member is authorized to modify a different task of the current project plan;
the different team member device enables the different team member to create proposed modifications to the different task of the current project plan;
the different team member device enables the different team member to submit the proposed modifications to the different task to the project manager device;
the project manager device modifies the shared copy of the current project plan to include the proposed modifications to the different task;
the project manager device enables viewing of the shared copy of the current project plan, with the proposed modifications to the different task, on the different team member device;
the project manager device enables viewing of the shared copy of the current project plan, without the proposed modifications to the different task, on unauthorized team member devices; and
the project manager device analyzes the impact of proposed modifications to the different task on the shared copy of the current project plan independent of the proposed modifications to the particular task.

15. A computer implemented method comprising:
creating, by a project manager device, a shared copy of a current project plan stored in a database, the current project plan including a plurality of tasks, each task identifying a team member authorized to Propose modifications to the task;
enabling, by the project manager device, viewing of the shared copy of the current project plan on a plurality of team member devices;
determining, by a particular team member device, whether a particular team member is authorized to modify a particular task of the current project plan;
enabling, by the particular team member device, the particular team member to create proposed modifications to the particular task of the current project plan;
enabling, by the particular team member device, the particular team member to submit the proposed modifications to the particular task to the project manager device;
modifying, by the project manager device, the shared copy of the current project plan to include the proposed modifications to the particular task;
enabling, by the project manager device, viewing of the shared copy of the current project plan, with the proposed modifications to the particular task, on the particular team member device;
enabling, by the project manager device, viewing of the shared copy of the current project plan, without the proposed modifications to the particular task, on unauthorized team member devices;
enabling, by the project manager device, acceptance of the proposed modifications to the particular task by the project manager; and
saving, by the project manager device, the shared copy of the current project plan as the current project plan in the database.

16. The method of claim 15, further comprising analyzing the impact of the proposed modifications to the particular task, including determining any consequential changes upstream or downstream from the proposed modifications.

17. The method of claim 15, further comprising:
enabling, by the project manager device, rejection of the proposed modifications to the particular task by the project manager; and
removing, by the project manager device, the proposed modifications to the particular task from the shared copy of the current project plan.

18. The method of claim 15, further comprising:
determining, by a different team member device, whether a different team member is authorized to modify a different task of the current project plan;
enabling, by the different team member device, the different team member to create proposed modifications to the different task of the current project plan;
enabling, by the different team member device, the different team member to submit the proposed modifications to the different task to the project manager device;
modifying, by the project manager device, the shared copy of the current project plan to include the proposed modifications to the different task;
enabling, by the project manager device, viewing of the shared copy of the current project plan, with the proposed modifications to the different task, on the different team member device;
enabling, by the project manager device, viewing of the shared copy of the current project plan, without the proposed modifications to the different task, on unauthorized team member devices;
analyzing the impact of the proposed modifications to the different task on the current project plan independent of the proposed modifications to the particular task, including determining any consequential changes upstream or downstream from the proposed modifications to the different task.

19. A computer implemented method comprising:
creating, by a processor, a shared copy of a current project plan stored in a database, the current project plan including a plurality of tasks, each task identifying a team member authorized to propose modifications to the task;
enabling viewing of the shared copy of the current project plan on a plurality of team member devices;
modifying the shared copy of the current project plan to include proposed modifications to a particular task of the current project plan received from an authorized team member device;
enabling viewing of the shared copy of the current project plan, with the proposed modifications to the particular task, on the authorized team member device;
enabling viewing of the shared copy of the current project plan, without the proposed modifications to the particular task, on unauthorized team member devices;
analyzing the impact of the proposed modifications on the current project plan, including determining any consequential changes upstream or downstream from the proposed modifications, and determining an impact on other tasks, timeframes, and operators that are part of the current project plan;

enabling acceptance of the proposed modifications, and, if accepted, saving the shared copy of the current project plan as the current project plan in the database; and enabling rejection of the proposed modifications, and, if rejected, removing the proposed modifications from the shared copy of the current project plan.

20. The method of claim 19, further comprising modifying the shared copy of the current project plan to include proposed modifications to a different task of the current project plan received from a different authorized team member device;

enabling viewing of the shared copy of the current project plan, with the proposed modifications to the different task, on the different authorized team member device;

enabling viewing of the shared copy of the current project plan, without the proposed modifications to the different task, on unauthorized team member devices;

analyzing the impact of the proposed modifications to the different task on the current project plan independent of the proposed modifications to the particular task, including determining any consequential changes upstream or downstream from the proposed modifications.

\* \* \* \* \*